June 24, 1952  W. H. TANKE  2,601,464
IMPLEMENT TIRE
Filed March 16, 1948
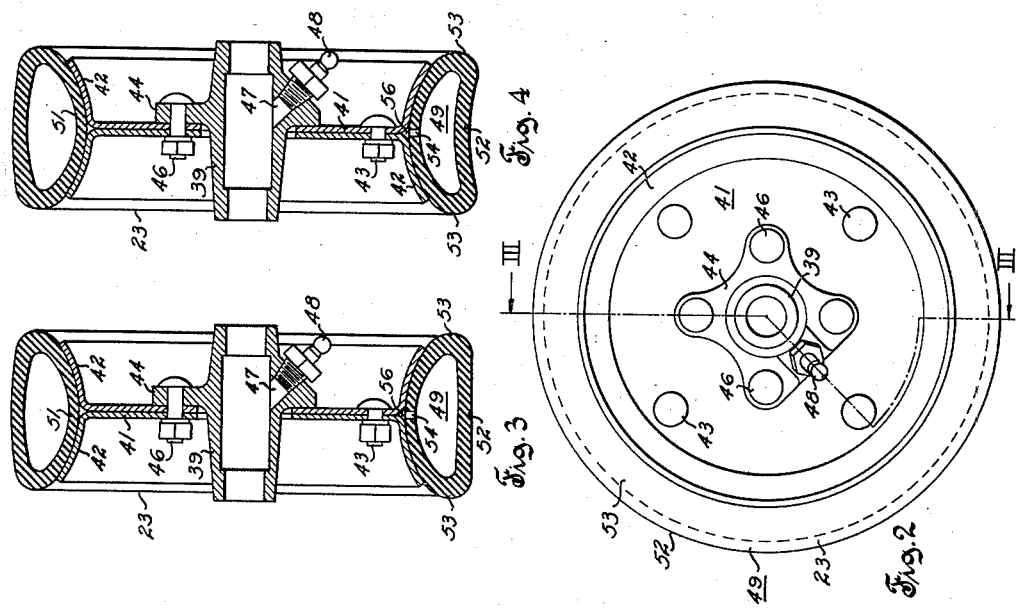
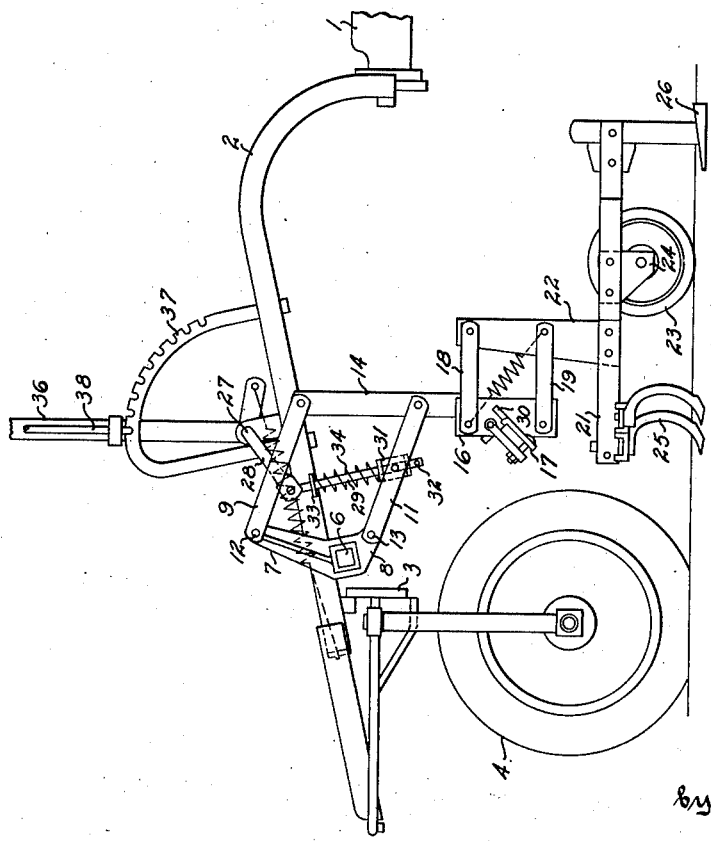
Inventor
Willard H. Tanke
By Kimbell & Wyman
Attorney Patented June 24, 1952

2,601,464

UNITED STATES PATENT OFFICE 2,601,464

IMPLEMENT TIRE

Willard H. Tanke, La Crosse, Wis., assignor to Allis-Chalmers Manufacturing Company, Milwaukee, Wis., a corporation of Delaware Application March 16, 1948, Serial No. 15,122

18 Claims. (Cl. 152—327)

This invention relates generally to vehicle supporting wheels and more particularly to the construction of the tire portion of a wheel functioning as a ground engaging support and gauge means for vehicles such as agricultural implements and the like propelled over tilled or loose soil.

In the operation of tillage tools, for example an independent floating gang cultivator, it has heretofore been common practice to employ an iron tired gauge wheel on each gang and a scraper element associated with the tread periphery of each tire in order to remove the moist soil which invariably adheres thereto. And even though a scraper element is employed, it must be spaced somewhat from the tread periphery in order to avoid rubbing contact therewith and as a result some soil remains on the wheel which increases rolling resistance and also the weight of the implement. Similar wheels have also been employed on planters and their operation on such implements has not been entirely satisfactory, particularly in planting small seed vegetables in shallow furrows having a depth often as little as one fourth of an inch, since if the wheel is placed ahead of the seed depositing spout sufficient soil is frequently taken up on the wheel to form a seed receiving furrow which is entirely too deep for best results whereas if the wheel is positioned to roll over the covered seeds, the seeds are frequently uncovered or picked up with the dirt adhering to the wheel. Moreover, if such a wheel is to travel satisfactorily over soil of varying looseness or over loose soil containing cobble size stones or other hard objects, the tread must be wider than necessary for use on firmer soil since if the wheel cuts into the soil to an appreciable extent, it will rise relative to the ground upon encountering firmer soil or a hard object thereby varying the depth of tool penetration as much or more than one fourth of an inch. And such a variation is entirely too much for obtaining complete mechanical cultivation of those row crops which necessitate operating with the tools set close to the plant rows and maintaining a uniform depth of tool penetration not exceeding one fourth of an inch.

Rubber tired wheels have also been employed on such implements possibly with the thought in mind that moist soil is less likely to adhere to a smooth wet rubber surface than it is to an iron tire which invariably presents a rust roughened surface. And, although pneumatic and semipneumatic types of tires have been tried, their use in this connection has been discontinued, even though some types of soil have less tendency to adhere to a wet rubber surface. The reason for the discontinuance probably is that if a tire circular in cross section is employed the extent of penetration in loose soil is entirely too great for accurate gauging, and if the size of the tire is increased, its cost and size becomes prohibitive for implement use. Moreover, if the tire is shaped to increase its peripheral tread surface, the cost is increased considerably, and, in addition, the tendency of moist soil to adhere thereto appears to increase as a function of tread width. Consequently, a mere increase in the tread width of such tires invariably necessitates the use of scraper elements in order to obtain satisfactory operation in all types of moist soil.

It is, therefore, an object of this invention to provide a wheel functioning as a support and gauge means for vehicles with a tire portion embodying improved features of construction affording a self-cleaning tread or ground engaging surface.

Another object of this invention is to provide a wheel of the type above mentioned with an improved tire construction affording a relatively wide ground engaging tread or supporting surface of which the effective area varies as a function of load and of the looseness of the soil over which the wheel is rolling.

Still another object of the present invention is to provide an agricultural implement with an improved gauge wheel affording a resilient generally flat tread or supporting surface which flexes under load and assumes a concave shape in rolling over loose soil.

A further object of this invention is to provide an improved semipneumatic tire for the gauge wheel of an agricultural implement adapted to be propelled over tilled soil, the tire incorporating features of construction affording a self-cleaning flexing action and simulating a floating support effective on all types and conditions of soil.

An additional object of the present invention is to provide an improved gauge wheel tire incorporating features affording a simple, durable and relatively inexpensive construction of practical dimensions for implement use.

The construction and operation of apparatus embodying the invention will become readily apparent as the disclosure progresses and particularly points out additional objects and features considered of special importance. And accordingly the present invention may be considered as comprising the various constructions and/or combinations hereinafter more fully set forth in the detailed description and appended claims, reference being had to the accompanying drawing illustrating an embodiment of the invention and in which:

Fig. 1 is a partial side elevation of a tractor mounted implement incorporating a gauge wheel constructed in accordance with the present invention;

Fig. 2 is an enlarged side elevation of the gauge wheel shown in Fig. 1;

Fig. 3 is a sectional view taken on line III—III of Fig. 2; and

Fig. 4 is a view similar to Fig. 3 illustrating the manner in which the tire deflects in rolling over loose soil.

Referring to Fig. 1, it should be apparent that the implement is shown as attached to a tractor of the rear engine type and that the engine, rear traction means and other parts nonessential to a complete understanding of the present invention have been omitted in the interest of simplicity. The tractor frame forward of the rear traction means (not shown) comprises a horizontal portion 1, and an intermediate part 2 which arches upward abruptly from portion 1 and then extends forward and downward to a front axle structure 3 suitably mounting a dirigible front wheel 4. The forward portion of part 2 fixedly mounts a transverse bar 6 which in turn fixedly supports a hanger comprising an upwardly extending arm 7 and a depending arm 8. A pair of links 9 and 11 have forward end portions thereof supported on pivot mountings 12 and 13 carried by end portions of arms 7 and 8, respectively. Links 9 and 11 extend rearward and downward from arms 7 and 8 and have their rear ends pivotally connected with vertically spaced portions of a rigid link 14 thereby forming a generally parallel linkage having a vertically disposed rear link extending downward a considerable distance beneath lower link 11.

The lower end of rear link 14 is fixedly connected with and supports a tool rig comprising a vertically disposed part 16 having an intermediate portion thereof detachably connected with link 14 by means including a suitable connector 17, a pair of links 18 and 19 pivotally connected with end portions of part 16 and extending rearward therefrom, and an elongated tool frame 21 having an upstanding rigid part 22 pivotally secured to rear end portions of links 18 and 19. Part 16, links 18 and 19, and tool frame part 22 coact to form a substantially parallel linkage positioning tool frame 21 beneath links 18 and 19 in underslung generally aligned fore and aft relation thereto. A gauge wheel 23 is suitably mounted on hangers 24 depending from frame 21 intermediate upstanding part 22 and the rear end of the frame, the front end of the latter mounting a pair of tools 25. The rear end of frame 21 mounts a depending tool 26, these tools being preferably detachably secured to tool frame 21 for adjustment thereon in any suitable known manner, the details of which are not shown. A downward pivotal movement of links 18 and 19 relative to part 16 is limited by engagement of the underside of link 18 with a stop projection 30 on part 16.

A forward portion of frame part 2, somewhat to the rear of cross bar 6, operatively mounts a transverse rock shaft 27 having a lift arm 28 extending downward and forward between the upper link 9 and the adjacent side of frame part 2. The free end of arm 28 is connected with lower link 11 by means of a rod 29 having its upper end pivotally connected with arm 28 and having its lower end slidably extending through a bifurcated member 31 pivotally secured to the inner side of lower link 11 intermediate the ends thereof. The lower end of rod 29 is provided with a transverse pin 32 preventing withdrawal of this rod from bifurcated member 31, and with an annular spring seat 33 fixed to an upper portion thereof. And a compression spring 34 surrounds rod 29 with its upper end abutting seat 33 and with its lower end abutting the top side of member 31. Rock shaft 27 has fixed thereto an upwardly extending actuating lever 36 operatively associated with a notched quadrant 37 fixedly carried by frame part 2, lever 36 mounting a latch rod 38 operatively associated with quadrant 37. As shown, the parts are in their lowermost position and it should now be obvious that upon release of latch rod 38 and movement of lever 36 toward the right as viewed in Fig. 1, the mechanism comprising links 9, 11 and 14, links 18, 19 and 22, and tool frame 21 will be lifted relative to the ground through vertical swinging movement of links 9 and 11 about transverse axes afforded by pivot mountings 12 and 13.

Referring to Figs. 2 and 3, it will be noted that gauge wheel 23 comprises a conventional hub portion 39 and a combined disk and rim structure formed by a pair of identical annular disk elements 41 having laterally offset peripheral rim forming flanges 42, these disks being secured together with their flanges 42 disposed in oppositely offset relation by a circular series of four bolts 43 and to a radial flange 44 on hub portion 39 by another series of four bolts 46. Hub portion 39 may be provided with a lubricating bore 47 receiving a conventional fitting 48. Flanges 42 curve upwardly and coact to form a substantially continuous rim presenting an outwardly facing concave surface. And a ring-like hollow tube 49 of resilient material, such as rubber, has a smooth inner peripheral surface or wall section 51 conforming with and abutting the concave rim surface and has a smooth outer wall or peripheral tread section 52, these inner and outer wall sections merging with similar side wall sections 53. Inner wall section 51 has an opening 54 therethrough placing the interior of the tube in continuous communication with the atmosphere through a peripheral channel 56 between rim flanges 42, it being understood that wheel disks 41 are not held in pneumatically sealed relation by the clamping action of bolts 43 and 46.

Tube 49 is of generally elliptical shape in transverse cross section with its major axis disposed approximately at a right angle with respect to the diameter of said wheel. Stated differently, the effective width of the tread section 52 is considerably greater than the width of the rim engaging section 51, the latter preferably having an effective width approximately equal to the width of the wheel rim. In other words, the effective width of the tread section or ground engaging surface is nearly or approximately equal to the length of the said major axis, and preferably should be at least equal to the width of the inner section or wheel rim engaging surface as measured on a line at a right angle to a diameter of the wheel. The radial thickness of the rim and tread sections may be approximately equal, but in any event should be considerably less than the wall thickness of the similar side sections 53 to thereby afford a widening flexing action under load.

In rolling the wheel over fairly firm ground, the ground engaging surface of the tire remains substantially flat as it appears in Fig. 3, whereas in rolling over very loose soil, the ground engaging surface flexes upward intermediate the side portions thereof and presents a concave surface similar to that shown in Fig. 4. And in this connection it should be understood that irrespective of the condition of the soil, the ground engaging or tread surface flattens or widens somewhat under load thus producing a continuous self-cleaning flexing action of the tread section. This feature is important as it permits dispensing with the use of tread scraping elements or the like. In addition, the upwardly concave configuration assumed by the tread surface in passing over loose fine soil increases its effective supporting area and thereby floatability, that is the ability of the wheel to roll over rather than through loose soil.

In other words, the effective area of the ground engaging portion of the tread section varies as a function of the load on the wheel and as a function of the fineness and looseness of the soil over which the wheel is rolling, this action being primarily attributable to the inner and outer wall sections being relatively thin and flexible as compared to the side wall sections. Consequently for a given wheel load, the effective area of the ground engaging tread surface flexibly increases as a function of the fineness and looseness of the soil over which the wheel is rolling. This feature is also important in that it is of material aid in maintaining an extremely uniform depth of tool penetration. Still another feature of importance is that the general cross sectional configuration including the relative overall dimensions and the relative wall thicknesses herein specified affords an effective self-cleaning flexing action and a high degree of floatability, all with a low cost construction of practical size.

It should be understood that although apparatus embodying the invention is of particular utility when applied to the gauge and/or press wheels of a vegetable cultivator or planter, certain features thereof are of more general application, and that therefore it is not intended to limit the invention to the exact details of construction herein shown and described for purposes of illustration, as various modifications within the scope of the appended claims may occur to persons skilled in the art.

It is claimed and desired to secure by Letters Patent:

1. In an agricultural implement having a tool carrying rig mounted for vertical floating movement, an improved self-cleaning gauge means carried by said rig and comprising a ground engaging wheel having a rim presenting an outwardly facing concave peripheral surface having a continuously open air passage extending inward therethrough and formed in part by a groove extending centrally, circumferentially of said surface, and a ring-like hollow tube of resilient material having a smooth inner circumferential wall section conforming with and abutting said concave rim surface and having a transverse cross section of generally elliptical shape with its major axis disposed approximately at a right angle with respect to the diameter of said wheel, said inner wall section having an opening therethrough placing the interior of said tube in continuous communication with said groove, and said tube also including similar side wall sections and a tread section having an effective ground engaging width nearly equal to the length of said major axis, said inner and tread sections each having a wall thickness considerably less than the wall thickness of said side sections.

2. In an agricultural implement having a tool carrying rig mounted for vertical floating movement, an improved self-cleaning gauge means carried by said rig and comprising a ground engaging wheel having a rim presenting an outwardly facing concave peripheral surface having a continuously open air passage extending inward therethrough and formed in part by a groove extending centrally, circumferentially of said surface, and a ring-like hollow tube of resilient material having a smooth inner circumferential wall section conforming with and abutting said concave rim surface and having an opening therethrough placing the interior of said tube in continuous communication with said groove, and said tube also including similar side wall sections and a tread section having an effective ground engaging width considerably greater than the width of said rim, said inner and tread sections each having a wall thickness considerably less than the wall thickness of said side sections.

3. In an agricultural implement having a tool carrying rig mounted for vertical floating movement, an improved self-cleaning gauge means carried by said rig and comprising a ground engaging wheel having a rim presenting an outwardly facing concave peripheral surface, and a ring-like hollow tube of resilient material having a smooth inner circumferential wall section conforming with and abutting said concave rim surface and having a transverse cross section of generally elliptical shape with its major axis disposed approximately at a right angle with respect to the diameter of said wheel, said rim and inner wall section having abutting portions thereof provided with continuously connected air passage means extending therethrough and placing the interior of said tube in constant communication with the atmosphere, and said tube also including similar side wall sections and a tread section having an effective ground engaging width nearly equal to the length of said major axis, said inner and tread sections each having a wall thickness considerably less than the wall thickness of said side sections.

4. In an agricultural implement having a tool carrying rig mounted for vertical floating movement, an improved self-cleaning gauge means carried by said rig and comprising a ground engaging wheel having a rim presenting an outwardly facing concave peripheral surface, and a ring-like hollow tube of resilient material having a smooth inner circumferential wall section conforming with and abutting said concave rim surface, said rim and inner wall section having abutting portions thereof provided with continuously connected air passage means extending therethrough and placing the interior of said tube in constant communication with the atmosphere, and said tube also including similar side wall sections and a tread section having an effective ground engaging width approximately equal to the width of said rim, said inner and tread sections each having a wall thickness considerably less than the wall thickness of said side sections.

5. In an agricultural implement having a tool carrying rig mounted for vertical floating movement, an improved self-cleaning gauge means carried by said rig and comprising a ground engaging wheel having a rim presenting an outwardly facing concave peripheral surface, and a ring-like hollow tube of resilient material having a smooth inner circumferential wall section conforming with and abutting said concave rim surface, said rim and inner wall section having abutting portions thereof provided with continuously connected air passage means extending therethrough and placing the interior of said tube in constant communication with the atmosphere, and said tube also including similar side wall sections and a tread section having a wall thickness considerably less than the wall thickness of said side sections and having an effective ground engaging width approximately equal to the width of said rim.

6. In combination with an implement gauge wheel presenting an outwardly facing peripheral rim surface, a ring-like hollow tube of resilient material having a smooth inner circumferential wall section conforming with and abutting said rim surface, said rim and inner wall section having abutting portions thereof provided with continuously connected air passage means extending therethrough and placing the interior of said tube in constant communication with the atmosphere, and said tube also including similar side wall sections and a tread section presenting a generally flat ground engaging surface, the latter section having a wall thickness considerably less than the wall thickness of said side sections and having a tread width at least equal to the width of said rim section measured on a line at a right angle to the diameter of said wheel.

7. In combination with an implement gauge wheel presenting an outwardly facing peripheral rim surface, a ring-like hollow tube of resilient material having a smooth inner circumferential wall section conforming with and abutting said rim surface, said rim and inner wall section having abutting portions thereof provided with continuously connected air passage means extending therethrough and placing the interior of said tube in communication with the atmosphere, and said tube also including similar side wall sections and a tread section presenting a generally flat ground engaging surface, the latter and inner sections having thin walls as compared to the wall thickness of said side sections such that the effective area of the ground engaging surface of the tread section varies as a function of the load on the wheel and of the looseness of the soil engaged by said surface.

8. In combination with an implement gauge wheel presenting an outwardly facing peripheral rim surface, a ring-like hollow tube of resilient material having a smooth inner circumferential wall section conforming with and abutting said rim surface, said rim and inner wall section having abutting portions thereof provided with continuously connected air passage means extending therethrough and placing the interior of said tube in constant communication with the atmosphere, and said tube also including similar side wall sections and a tread section presenting a generally flat ground engaging surface, the latter and inner wall sections being relatively thin and flexible as compared to said side wall sections so that for a given wheel load the effective area of the ground engaged tread surface flexibly increases as a function of the fineness and looseness of the soil over which the wheel is rolling.

9. A semipneumatic tire for the gauge wheel of an agricultural implement comprising a closed ring of hollow tube-like resilient material having similar side wall sections merging with and uniting inner and outer wall sections coextensive with the inner and outer circumferences, respectively, of said ring, said outer section having a wall thickness considerably less than the wall thickness of said side sections and presenting a generally flat ground engaging surface having an effective width considerably greater than the width of said inner section, and said inner section having means continuously permitting the passage of air therethrough, said means comprising an opening in said inner section placing the interior of the tire in constant communication with the atmosphere.

10. A semi-pneumatic tire for the gauge wheel of an agricultural implement comprising a closed ring of hollow tube-like resilient material having an air confining space extending circumferentially throughout said ring, said tire including similar side wall sections merging with and uniting inner and outer wall sections coextensive with the inner and outer circumferences, respectively, of said ring, said inner and outer sections each having a wall thickness considerably less than the wall thickness of said side sections and said outer section presenting a generally flat ground engaging surface having an effective width at least equal to the width of said inner section, and said inner section having means continuously permitting the passage of air therethrough, said means comprising an opening in said inner section placing said air confining space in constant communication with the atmosphere.

11. A semipneumatic tire for the gauge wheel of an agriculture implement comprising a closed ring of hollow tube-like resilient material having a transverse cross section of generally elliptical shape with its major axis disposed approximately at a right angle with respect to the diameter of the ring, said tire presenting a peripheral tread portion having a wall thickness considerably less than the thickness of the side wall portions merging therewith and having an effective ground engaging width nearly equal to the length of said major axis, and said tire also having means continuously permitting the passage of air into and out of the tire, said means comprising an opening through a rim engaging wall portion thereof placing the interior of the tire in constant communication with the atmosphere.

12. A semipneumatic tire for the gauge wheel of an agricultural implement comprising a closed ring of hollow tube-like resilient material having a transverse cross section of generally elliptical shape with its major axis disposed approximately at a right angle with respect to the diameter of the ring, said tire including similar side wall sections merging with and uniting inner and outer wall sections coextensive with the inner and outer circumferences, respectively, of said ring, said inner and outer sections each having a wall thickness considerably less than the wall thickness of said side sections and said outer section presenting a ground engaging surface having an effective width nearly equal to the length of said major axis, and said inner section having means continuously permitting the passage of air therethrough, said means comprising an opening in said inner section placing the interior of the tire in constant communication with the atmosphere.

13. A semipneumatic tire for a wheel of an agricultural implement and the like comprising a closed hollow tube-like ring of resilient material having side wall portions merging with an inner wheel rim engaging portion and having an outer peripheral tread portion flexibly bridging said side portions, said portions presenting inner surfaces defining a circumferentially continuous interior space having a transverse cross section of generally elliptical shape with its major axis disposed approximately at a right angle to the diameter of the ring, said tire having an opening through a wall portion thereof placing said interior space in continuous communication with the atmosphere, and said tread portion flexing inward under normal load sufficiently to provide an effective ground engaging width at least equal to the length of said major axis, and being further flexible inward in accordance with the condition of the soil to thereby increase the effective area of the ground engaging tread surface.

14. A semipneumatic tire for a wheel of an agricultural implement and the like comprising a closed hollow tube-like ring of resilient material having side wall portions merging with an inner wheel rim engaging portion and with an outer peripheral tread portion, said merging portions presenting inner surfaces defining a circumferentially continuous interior space having a transverse cross section of generally elliptical shape with its major axis disposed approximately at a right angle to the diameter of the ring, said tire having an opening through a wall portion thereof placing said interior space in continuous communication with the atmosphere, and said tread portion having a ground engaging width at least equal to the length of said major axis and being flexible inward between said side portions sufficiently to thereby increase the effective area of the ground engaging tread surface as a function of the looseness and fineness of the soil supporting a wheel provided with said tire.

15. A semipneumatic tire for a wheel of an agricultural implement or the like comprising a closed hollow tube-like ring of resilient material having a transverse cross section of generally elliptical shape with its major axis disposed approximately at a right angle to the diameter of the ring, said tire having side wall portions merging with an inner peripheral wheel rim engaging portion and having an outer peripheral tread portion flexibly bridging said side portions, said portions presenting inner surfaces defining a circumferentially continuous interior space having a transverse cross section similar to said elliptical shape, said tire having an opening through a wall portion thereof placing said interior space in continuous communication with the atmosphere, and said tread portion flexing inward under normal load sufficiently to provide an effective ground engaging width nearly equal to said major axis.

16. A semipneumatic tire for a wheel of an agricultural implement or the like comprising a closed hollow tube-like ring of resilient material having a transverse cross section of generally elliptical shape with its major axis disposed approximately at a right angle to the diameter of the ring, said tire having side wall portions merging with an inner peripheral wheel rim engaging portion, an outer peripheral tread portion flexibly bridging said side portions, and having an opening through a wall portion thereof placing said interior space in continuous communication with the atmosphere, and said tread portion flexing inward under normal load sufficiently to provide an effective ground engaging width nearly equal to said major axis.

17. In combination with an implement gauge wheel presenting an outwardly facing peripheral rim surface, a closed hollow tube-like ring of resilient material having an inner circumferential wall section conforming with and abutting said rim surface, said rim and inner wall section having abutting portions thereof provided with continuously connected air passage means extending therethrough and placing the interior of said tube in constant communication with the atmosphere, and said tube also having side wall sections merging with said inner wall section and having an outer peripheral tread section flexibly bridging said side sections, said sections presenting inner surfaces defining a circumferentially continuous interior space having a transverse cross section of generally elliptical shape with its major axis disposed approximately at a right angle to the diameter of the ring, and said tread section flexing inward under normal load sufficiently to provide an effective ground engaging width at least equal to the length of said major axis, and being further flexible inward in accordance with the condition of the soil to thereby increase the effective area of the ground engaging tread surface.

18. In combination with an implement gauge wheel presenting an outwardly facing peripheral rim surface, a closed hollow tube-like ring of resilient material having a transverse cross section of generally elliptical shape with its major axis disposed approximately at a right angle to the diameter of the ring and having an inner circumferential wall section conforming with and abutting said rim surface, said rim and inner wall section having abutting portions thereof provided with continuously connected air passage means extending therethrough and placing the interior of said tube in constant communication with the atmosphere, and said tube also having side wall sections merging with said inner wall section and having an outer peripheral tread section flexibly bridging said side sections, said sections presenting inner surfaces defining a circumferentially continuous interior space having a transverse cross section similar to said elliptical shape, and said tread section flexing inward under normal load sufficiently to provide an effective ground engaging width nearly equal to said major axis.

WILLARD H. TANKE.

REFERENCES CITED

The following references are of record in the file of this patent:

UNITED STATES PATENTS

| Number | Name | Date |
|---|---|---|
| 506,424 | Ducasble | Oct. 10, 1893 |
| 1,016,558 | Garrison | Feb. 6, 1912 |
| 1,091,379 | Mussinan | Mar. 24, 1914 |
| 1,442,603 | Coates | Jan. 16, 1923 |
| 1,470,938 | Semery | Oct. 16, 1923 |
| 1,554,370 | Renner | Sept. 22, 1925 |
| 1,654,035 | Campos et al. | Dec. 27, 1927 |
| 1,707,650 | Younggren et al. | Apr. 2, 1929 |
| 1,741,216 | White | Dec. 31, 1929 |
| 2,339,225 | Strandlund | Jan. 11, 1944 |
| 2,357,916 | Strandlund | Sept. 12, 1944 |
| 2,445,145 | Love | July 13, 1948 |

FOREIGN PATENTS

| Number | Country | Date |
|---|---|---|
| 9,696 | Great Britain | of 1912 |